US012789443B2

(12) United States Patent
Hanan et al.

(10) Patent No.: US 12,789,443 B2
(45) **Date of Patent: *Nov. 10, 2026**

(54) NOZZLE FOR REDUCED OUTWARD FORCE ON PREFORM FINISH

(71) Applicant: NIAGARA BOTTLING, LLC, Diamond Bar, CA (US)

(72) Inventors: Jay Clarke Hanan, Glendora, CA (US); Ahmed Tasnub Takaddus, Riverside, CA (US); Naser Imran Hossain, Aliso Viejo, CA (US)

(73) Assignee: NIAGARA BOTTLING, LLC, Diamond Bar, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 18/937,762

(22) Filed: Nov. 5, 2024

(65) Prior Publication Data

US 2025/0135708 A1 May 1, 2025

Related U.S. Application Data

(63) Continuation of application No. 18/306,102, filed on Apr. 24, 2023, now Pat. No. 12,172,360, which is a (Continued)

(51) Int. Cl.
*B29C 49/58* (2006.01)
*B29C 49/42* (2006.01)

(52) U.S. Cl.
CPC ...... *B29C 49/58* (2013.01); *B29C 2049/4294* (2013.01); *B29C 2791/002* (2013.01)

(58) Field of Classification Search
CPC .................. B29C 49/58; B29C 49/071; B29C 2949/0769; B29C 2949/0722; B29C 2949/28; B29C 2949/26; B29C 2049/4294; B29C 2949/0731; B29C 2949/0773; B29C 2791/002; B29C 2949/0868; B29C 2049/5896; B29C 2949/22; B29C 2949/077; B29C 2949/0732; B29C 49/42392; B29C 49/06; B29C 2949/0715;
(Continued)

(56) References Cited

U.S. PATENT DOCUMENTS 3,032,809 A 5/1962 Willard
3,303,249 A 2/1967 Strauss
(Continued)

FOREIGN PATENT DOCUMENTS

CN 102848559 A 1/2013
DE 102012001229 A1 7/2013
(Continued)

OTHER PUBLICATIONS

PCT Office, International Search Report, dated Jun. 12, 2020—PCT/US2020/023193.
(Continued)

*Primary Examiner* — Monica A Huson
(74) *Attorney, Agent, or Firm* — MICHAEL BEST & FRIEDRICH LLP

(57) ABSTRACT

A nozzle for forming a container preform into a plastic container includes a cylindrical portion having a seal configured to engage with a stepped interior of a finish portion of a preform.

19 Claims, 7 Drawing Sheets

Related U.S. Application Data continuation of application No. 16/821,564, filed on Mar. 17, 2020, now Pat. No. 11,633,899.

(60) Provisional application No. 62/820,121, filed on Mar. 18, 2019, provisional application No. 62/820,110, filed on Mar. 18, 2019.

(58) Field of Classification Search
CPC ........ B29C 2949/24; B29C 2949/0723; B29C 49/12; B29C 2049/4296; B29B 11/14; B29K 2067/003; B29L 2031/7158
See application file for complete search history.

(56) References Cited

U.S. PATENT DOCUMENTS

| | | | |
|---|---|---|---|
| 3,769,394 | A | 10/1973 | Latrielle |
| 4,850,850 | A | 7/1989 | Takakusaki et al. |
| 5,116,565 | A | 5/1992 | Yoshino et al. |
| 5,182,122 | A | 1/1993 | Uehara et al. |
| 5,340,302 | A | 8/1994 | Ingram |
| 5,498,152 | A | 3/1996 | Uterlander et al. |
| 5,756,172 | A | 5/1998 | Semersky |
| 5,792,491 | A | 8/1998 | Chaure |
| 5,795,598 | A | 8/1998 | Wohlgemuth et al. |
| 5,804,016 | A | 9/1998 | Schmidt et al. |
| 5,850,681 | A | 12/1998 | La Barre |
| 7,824,166 | B2 | 11/2010 | Mie et al. |
| 8,663,761 | B2 | 3/2014 | Kwirandt et al. |
| 8,827,688 | B2 | 9/2014 | Maki et al. |
| 9,033,168 | B2 | 5/2015 | Darr et al. |
| 9,233,771 | B2 | 1/2016 | Siegl |
| 9,994,350 | B2 | 6/2018 | Labadie et al. |
| 10,987,851 | B2 | 4/2021 | Hanan |
| 11,472,093 | B2 | 10/2022 | Hanan et al. |
| 11,633,899 | B2 | 4/2023 | Hanan et al. |
| 11,806,917 | B2 | 11/2023 | Hanan et al. |
| 12,172,360 | B2 * | 12/2024 | Hanan ..................... B29C 49/58 |
| 2002/0037338 | A1 | 3/2002 | Lisch et al. |
| 2003/0077349 | A1 | 4/2003 | Derouault et al. |
| 2004/0121038 | A1 | 6/2004 | Seki et al. |
| 2005/0175731 | A1 | 8/2005 | Chiang |
| 2008/0050546 | A1 | 2/2008 | Kitano et al. |
| 2008/0257855 | A1 | 10/2008 | Patel |
| 2010/0178148 | A1 | 7/2010 | Forsthoevel et al. |
| 2010/0314348 | A1 | 12/2010 | Zoppas et al. |
| 2013/0113143 | A1 | 5/2013 | Favre et al. |
| 2014/0157726 | A1 | 6/2014 | Clusserath et al. |
| 2014/0314984 | A1 | 10/2014 | Lehner et al. |
| 2015/0027974 | A1 | 1/2015 | Niec |
| 2015/0190975 | A1 | 7/2015 | Yokobayashi et al. |
| 2015/0191269 | A1 | 7/2015 | Siegl |
| 2016/0193750 | A1 | 7/2016 | Gaiotti et al. |
| 2018/0133948 | A1 | 5/2018 | Suyama et al. |
| 2020/0031530 | A1 | 1/2020 | Hanan |
| 2020/0269484 | A1 | 8/2020 | Hanan |
| 2020/0298461 | A1 | 9/2020 | Hanan et al. |
| 2023/0069550 | A1 | 3/2023 | Hanan |
| 2023/0192344 | A1 | 6/2023 | Hanan |
| 2024/0075674 | A1 | 3/2024 | Hanan et al. |

FOREIGN PATENT DOCUMENTS

| | | | |
|---|---|---|---|
| JP | S5486560 | A | 7/1979 |
| JP | S62164504 | A | 7/1987 |
| WO | 2010113079 | A2 | 10/2010 |
| WO | 2016103563 | A1 | 6/2016 |
| WO | 2017136584 | A1 | 8/2017 |

OTHER PUBLICATIONS

European Patent Office Extended Search Report for Related Application No. 20763607.7 dated Oct. 5, 2022 (5 pages).
European Patent Office Extended Search Report for Related Application No. 20774670.2 dated Oct. 21, 2022 (11 pages).
European Patent Office Extended Search Report for Related Application No. 24165660.2 dated Aug. 21, 2024 (7 pages).
European Patent Office Extended European Search Report for Related Application No. 24172208.1 dated Oct. 17, 2024 (20 pages).

* cited by examiner

NOZZLE FOR REDUCED OUTWARD FORCE ON PREFORM FINISH

PRIORITY

The application is a continuation and claims priority to U.S. patent application Ser. No. 18/306,102, filed Apr. 24, 2023, which is a continuation of and claims priority to U.S. patent application Ser. No. 16/821,564, filed Mar. 17, 2020, which claims the benefit of and priority to U.S. Provisional Application, entitled "Nozzle For Reduced Outward Force On Preform Finish," filed on Mar. 18, 2019 and having application Ser. No. 62/820,110, and to U.S. Provisional Application, entitled "Nozzle For Engaging Interior Surface Of Preform Finish," filed on Mar. 18, 2019 and having application Ser. No. 62/820,121, the entirety of both of said applications being incorporated herein by reference.

FIELD

Embodiments of the present disclosure generally relate to the field of plastic bottles and preforms. More specifically, embodiments of the disclosure relate to a nozzle for blow-molding a container preform that includes a stepped interior surface.

BACKGROUND

Plastic containers have been used as a replacement for glass or metal containers in the packaging of beverages for several decades. The most common plastic used in making beverage containers today is polyethylene terephthalate (PET). Containers made of PET are transparent, thin walled, and have the ability to maintain their shape by withstanding the force exerted on the walls of the container by their contents. PET resins are also reasonably priced and easy to process. PET bottles are generally made by a process that includes the blow-molding of plastic preforms which have been made by injection molding of the PET resin.

Advantages of plastic packaging include lighter weight and decreased breakage as compared to glass, and lower costs overall when taking both production and transportation into account. Although plastic packaging is lighter in weight than glass, there is still great interest in creating the lightest possible plastic packaging so as to maximize the cost savings in both transportation and manufacturing by making and using containers that contain less plastic.

A plastic container for storing liquid contents typically includes a base that extends up to a grip portion suitable for affixing a label, as well as providing a location for grasping the container. The grip portion generally transitions into a shoulder, which connects to a bell. The bell has a diameter that generally decreases as the bell extends upward from the shoulder to a neck and a finish. The finish is adapted to receive a closure, such as a bottle cap, to seal the contents within the interior of the plastic container.

In many instances, the closure includes a tamper evidence band that is disposed around the perimeter of the finish. The tamper evidence band generally remains positioned on the finish when an end-user loosens the closure to access the contents within the container. As such, the tamper evidence band and the finish cooperate to indicate to the end-user whether or not the closure has been previously loosened after being installed by the manufacturer.

Advantages of plastic containers include lighter weight and decreased breakage as compared to glass, and lower costs overall when taking both production and transportation into account. As such, there is a continuous interest in creating the lightest possible plastic container so as to maximize cost savings in both transportation and manufacturing by making and using containers that contain less plastic.

One difficulty that may be encountered when working with relatively light plastic containers is damaging the preforms during the blow-molding process. In some instances, conventional equipment for blow-molding lightweight preforms into containers can crack, scrape, or otherwise damage the preforms, thereby rendering such preforms useless. For example, the relatively thin sidewalls of a lightweight preform are predisposed to cracking when a conventional nozzle for blow-molding the preform is inserted into the finish portion of the preform. As such, there is a need for equipment suitable for forming the lightest possible plastic containers without damaging the thin-walled preforms during the blow-molding process. Embodiments disclosed herein provide nozzles that can be engaged with lightweight preforms for forming the preforms into plastic containers without damaging the finish portion or the thin walls of the preforms.

SUMMARY

A nozzle is provided for engaging with lightweight preforms for blow-molding the preforms into plastic containers without damaging the finish portion of the preforms. The nozzle includes a seal configured to engage with a stepped interior of the finish portion and enables stretching and/or blow-molding the preform into a container. The seal tightly engages a smooth surface inside the finish portion without damaging the surface or a sidewall of the finish portion. In some embodiments, the seal includes a profile shape that mates with a transitional surface comprising the stepped interior of the finish portion. The profile shape distributes the contact force of the seal over a maximal area of the transition surface so as to minimize the total pressure exerted onto the finish portion. The profile shape reduces potential cracking of a thin-walled region of the finish portion during stretching and/or blow-molding the preform to form the container. In some embodiments, the seal is configured to tightly engage with a shelf comprising the stepped interior of the finish portion without exerting outwardly-directed forces on a sidewall of the finish portion. The shelf comprises a mirror-polished surface capable of receiving the seal and may include a concave profile shape or a squared profile shape. The seal generally includes a shape suitable for engaging the profile shape of the shelf. Engaging the seal and the shelf reduces potential cracking of a thin-walled region of the finish portion during stretching and/or blow-molding the preform to form the container.

In an exemplary embodiment, a nozzle for forming a container preform into a plastic container comprises: a cylindrical portion including a seal configured to engage with a stepped interior of a finish portion of a preform; and an opening disposed in the cylindrical portion and configured to enable instruments to be inserted into the preform for stretching and/or blow-molding the preform into the container.

In another exemplary embodiment, the nozzle further includes a tapered tip comprising a narrowing of a diameter of the cylindrical portion forward of the seal so as to provide clearance between the nozzle and an interior surface of the finish portion. In another exemplary embodiment, the tapered tip is configured to prevent damage to the interior surface of the finish portion during insertion of the nozzle into the preform. In another exemplary embodiment, the tapered tip comprises an inwardly rounded portion of the cylindrical portion that is configured to prevent damage to a mirror-polished surface inside the finish portion during insertion of the nozzle into the preform. In another exemplary embodiment, the tapered tip comprises a linearly tapering diameter of the cylindrical portion forward of the seal.

In another exemplary embodiment, the cylindrical portion is configured to be advanced along a longitudinal axis of the preform and tightly engage the seal with the stepped interior of the finish portion. In another exemplary embodiment, the cylindrical portion comprises a diameter suitable for pressing the seal against a mirror-polished surface comprising the stepped interior while maintaining clearance between cylindrical portion and a sealing surface within the finish portion. In another exemplary embodiment, the cylindrical portion is configured to press the seal against a transition surface comprising the stepped interior. In another exemplary embodiment, the cylindrical portion is configured to press the seal against any of a concave portion, a convex portion, and a midpoint of the transition surface. In another exemplary embodiment, the cylindrical portion is configured to press the seal against a secondary transition surface while avoiding contact with a handling surface within the finish portion. In another exemplary embodiment, the cylindrical portion is configured to press the seal against a surface comprising the stepped interior such that a component of a contact force is directed parallel with a sidewall of the finish portion.

In another exemplary embodiment, the seal is disposed around a circumference of the cylindrical portion and configured to tightly engage with a smooth surface inside the finish portion. In another exemplary embodiment, the seal is configured to tightly press against a mirror-polished surface of the finish portion without damaging the surface or a sidewall of the finish portion. In another exemplary embodiment, the seal includes any of a washer, a band, or an edge portion of the cylindrical portion comprised of a material suitable for tightly sealing with the preform without damaging a mirror-polished surface within the finish portion. In another exemplary embodiment, the seal comprises a material capable of sealing with the material comprising the preform. In another exemplary embodiment, the seal comprises any of rubber, silicone, relatively softer PET that PET comprising the preform, and any combination thereof.

In another exemplary embodiment, the seal includes a profile shape that is circumferentially disposed around the seal and configured to mate with a transitional surface comprising the stepped interior of the finish portion, the transitional surface including a concave portion and a convex portion. In another exemplary embodiment, the profile shape includes an outwardly-rounded portion configured to engage with the concave portion and an inwardly-rounded portion configured to engage with the convex portion. In another exemplary embodiment, the profile shape is configured to distribute a contact force of the seal over a maximal area of the transition surface so as to minimize the total pressure exerted onto the finish portion. In another exemplary embodiment, the profile shape is configured to facilitate utilizing a relatively greater internal pressure within the preform without cracking a thin-walled region of the finish portion during stretching and/or blow-molding the preform to form the container.

In an exemplary embodiment, a nozzle for forming a container preform into a plastic container comprises: a cylindrical portion coupled with blow-molding equipment and configured to be advanced longitudinally into a finish portion of the container preform; a seal configured to engage with a shelf comprising a stepped interior of the finish portion; and an opening disposed in the cylindrical portion and configured to enable instruments to be inserted into the container preform for stretching and/or blow-molding the container preform into the plastic container.

In another exemplary embodiment, the seal is disposed at a forward-most location of the cylindrical portion and configured to tightly engage with the shelf inside the finish portion. In another exemplary embodiment, the seal comprises an O-ring disposed around a circumference of the cylindrical portion and is configured to tightly press against a concave profile shape of the shelf without damaging the surface or the sidewall of the finish portion. In another exemplary embodiment, the seal comprises a washer having a squared periphery that is disposed circumferentially around the seal, such that the seal may be tightly engaged with a right-angled profile shape of the shelf during stretching and/or blow-molding the container preform to form the container. In another exemplary embodiment, the seal is configured to contact the shelf without exerting outwardly directed forces on a sidewall of the finish portion. In another exemplary embodiment, the seal is configured to exert a contact force on the shelf along a longitudinal axis of the container preform parallel to a sidewall of the finish portion.

In another exemplary embodiment, the cylindrical portion comprises a diameter suitable for pressing the seal against the shelf while maintaining clearance between cylindrical portion and a sealing surface within the finish portion. In another exemplary embodiment, the cylindrical portion is configured to press an O-ring comprising the seal against a concave profile shape of the shelf. In another exemplary embodiment, the cylindrical portion is configured to press a washer comprising the seal against a right-angled profile shape of the shelf.

In an exemplary embodiment, an assembly for forming a plastic container comprises: a finish portion of a container preform configured to rotatably engage with a closure and to seal contents within an interior of a container formed from the preform; a shelf comprising a stepped interior of the finish portion; a nozzle including a cylindrical portion and a seal configured to engage with the shelf; and an opening disposed in the cylindrical portion and configured to enable instruments to be inserted into the container preform for stretching and/or blow-molding the container preform into the plastic container.

In another exemplary embodiment, the shelf comprises a mirror-polished surface capable of receiving the seal. In another exemplary embodiment, the shelf includes a concave profile shape that is circumferentially disposed within the interior of the finish portion. In another exemplary embodiment, the seal comprises an O-ring disposed around a circumference of the cylindrical portion and is configured to tightly press against the concave profile shape without damaging the surface or the sidewall of the finish portion. In another exemplary embodiment, the shelf includes a right-angled profile shape that is circumferentially disposed within the interior of the finish portion. In another exemplary embodiment, the seal comprises a washer having a squared periphery that is disposed circumferentially around the seal, such that the seal may be tightly engaged with the right-angled profile shape during stretching and/or blow-molding the container preform to form the container.

In another exemplary embodiment, the seal is disposed around a circumference of the cylindrical portion and configured to tightly engage with the shelf. In another exemplary embodiment, the seal includes any of a washer, a band, or an edge portion of the cylindrical portion comprised of a material suitable for tightly engaging the shelf. In another exemplary embodiment, the seal comprises a material capable of sealing with the material comprising the preform. In another exemplary embodiment, the seal comprises any of rubber, silicone, PET that is relatively softer than PET comprising the preform, and any combination thereof.

BRIEF DESCRIPTION OF THE DRAWINGS

The drawings refer to embodiments of the present disclosure in which.

Figure 1:
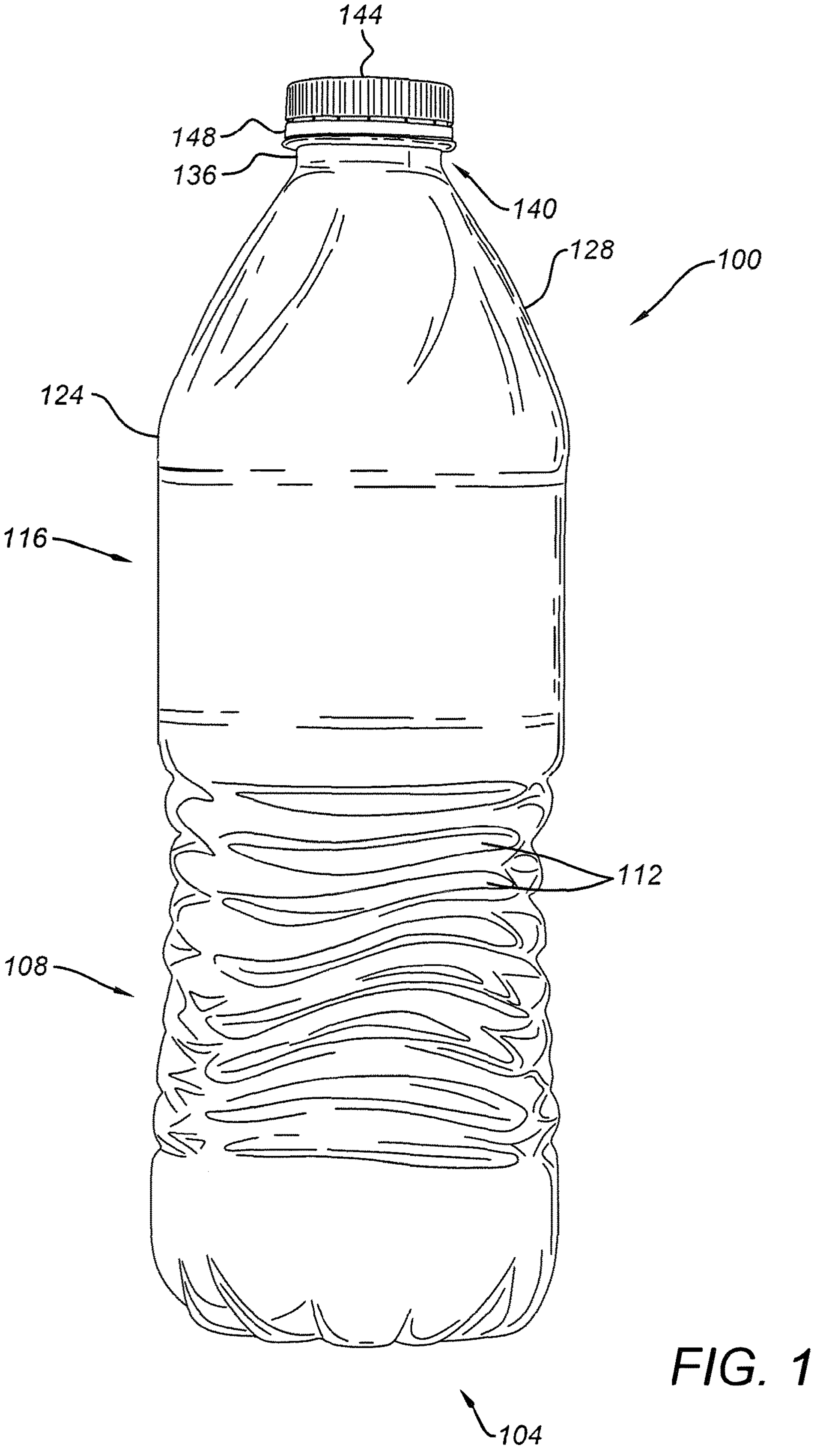
FIG. 1 illustrates a side view of an exemplary container suitable for storing pressurized contents.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first bottle," may be made. However, the specific numeric reference should not be interpreted as a literal sequential order but rather interpreted that the "first bottle" is different than a "second bottle." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, there is a continuous interest in creating the lightest possible plastic container so as to maximize cost savings in both transportation and manufacturing by making and using containers that contain less plastic. One difficulty often encountered when working with lightweight plastic containers is damaging the preforms during the blow-molding process. For example, the relatively thin walls of a lightweight preform frequently are subject to cracking when a conventional nozzle for blow-molding the preform is inserted into the finish portion of the preform. Embodiments disclosed herein provide nozzles that can be engaged with lightweight preforms for stretching and/or blow-molding the preforms into plastic containers without damaging the finish portion of the preforms.

FIG. 1 illustrates a side view of an exemplary container 100 typically used for storing liquid contents, such as water, juice, and particularly carbonated contents. The container 100 comprises a base 104 that extends up to a grip portion 108. In some embodiments, the base 104 may be of the petaloid variety, although other configurations of the base may be incorporated into the container 100, without limitation. The grip portion 108 comprises a plurality of grip portion ribs 112 (i.e., sidewall ribs). As illustrated in FIG. 1, the plurality of grip portion ribs 112 generally vary in depth, and swirl or angulate around the grip portion 108. A label portion 116 is connected to the grip portion 108 and comprises one or more label panel ribs (not shown). The label panel portion 116 transitions into a shoulder 124, which connects to a bell 128.

In the embodiment illustrated in FIG. 1, the bell 128 comprises a plurality of design features 132. In other embodiments, however, the bell 128 may include various other design features, or may be smooth and generally unornamented. The bell 128 connects to a neck 136, which connects to a finish 140. As shown in FIG. 1, the bell 128 comprises a diameter that generally decreases as the bell 128 extends upward from the shoulder 124 to the neck 136 and the finish 140. The finish 140 is adapted to receive a closure, such as by way of non-limiting example, a container cap or closure 144, so as to seal contents within the container 100. The finish 140 generally defines an opening that leads to an interior of the container 100 for containing a beverage, or other contents, such as any of a variety of carbonated soft drinks. The finish 140 may be of the Carbonated Soft Drink (CSD) variety or may be configured to receive closures suitable for sealing noncarbonated contents within the interior of the container 100.

Figure 3:
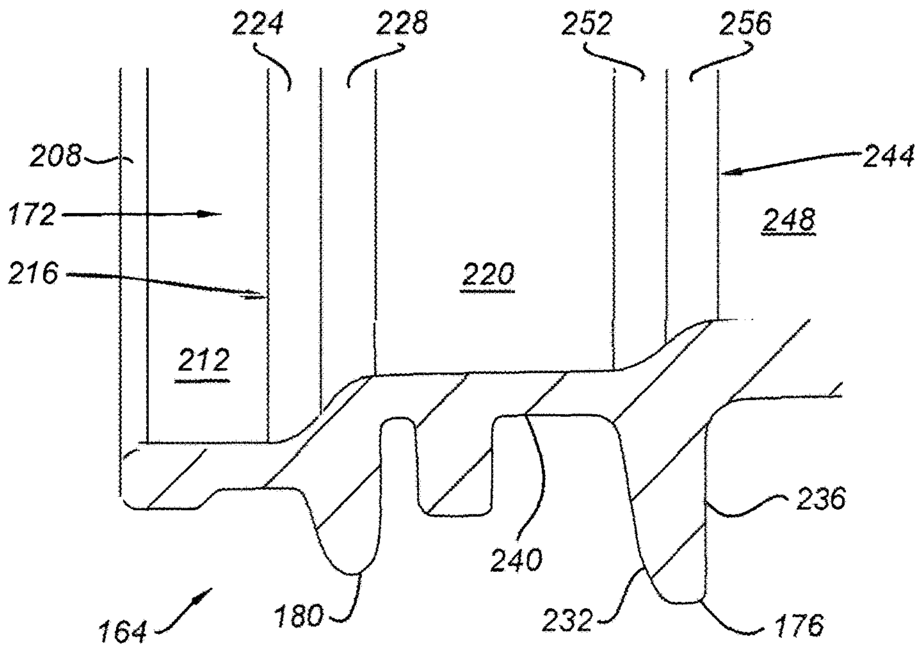
FIG. 3 illustrates a close-up cross-sectional view of a sidewall portion of a finish comprising the preform illustrated in FIG. 2, according to the present disclosure.

As shown in FIG. 1, a tamper evidence closure 144 may be threadably engaged with the finish 140 of FIG. 3. The closure 144 generally includes interior threads that are configured to engage with threads disposed on the finish 140, as described herein. During tightening of the closure 144 onto the finish 140, a plug seal of the closure 144 extends into the opening of the container 100 and enters into a pressed relationship with the finish 140 whereby contents may be sealed in the interior of the container 100.

As further shown in FIG. 1, the closure 144 includes a tamper evidence band 148 to provide an indication of whether or not the closure 144 has been loosened after being installed by a manufacturer. In some embodiments, the tamper evidence band 148 may be attached to the closure 144 by a multiplicity of thin connections. The tamper evidence band 148 may include a cam that is configured to fixedly engage with a tamper evidence ledge disposed on the finished 140 during loosening of the closure 144. Once the closure 144 is installed onto the finish 140 by a manufacturer and later an end-user loosens the closure 144, the cam engages the tamper evidence ledge, breaking the thin connections between tamper evidence band 148 and the closure 144. The tamper evidence band 148 remains positioned on the tamper evidence ledge after the closure 144 is removed from the container 100, As such, the tamper evidence band 148 cooperates with the tamper evidence ledge to indicate to the end-user whether or not the closure 144 has been previously loosened after being installed by the manufacturer.

Figure 2:
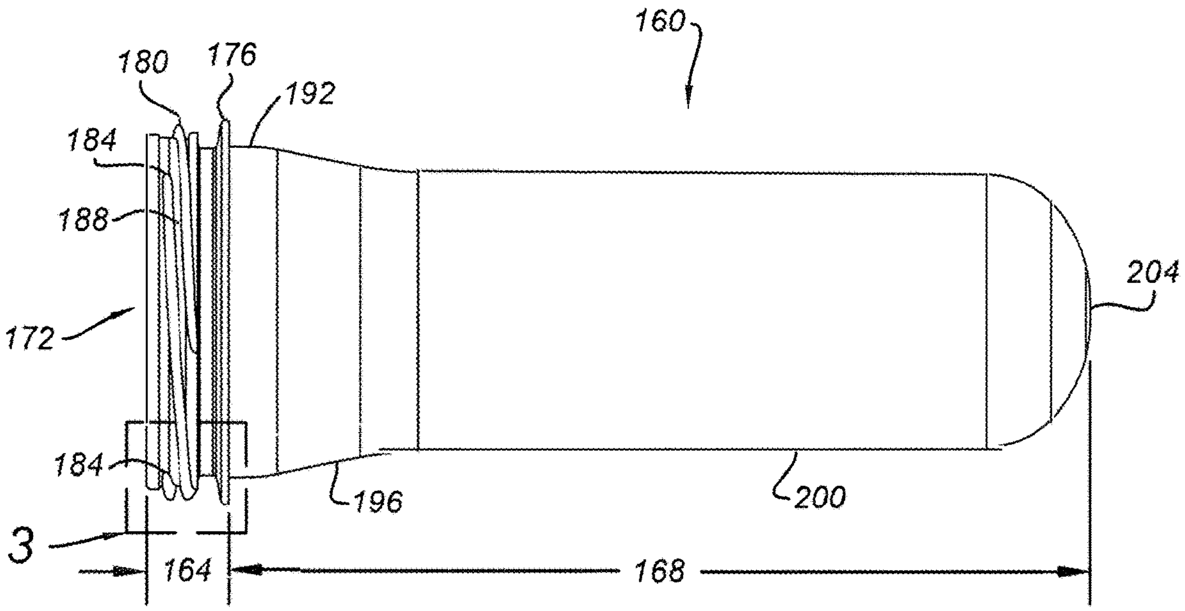
FIG. 2 a side plan view of an exemplary embodiment of a preform suitable for being blow-molded to form a container in accordance with the present disclosure.

FIG. 2 illustrates an exemplary embodiment of a preform 160 suitable for being blow-molded to form a plastic bottle, such as the container 100, according to the present disclosure. The preform 160 preferably is made of material approved for contact with food and beverages such as virgin PET or recycled PET and can be of any of a wide variety of shapes and sizes. The preform 160 shown in FIG. 2 is of the type which will form a 12-16 oz. beverage bottle, but as will be understood by those skilled in the art, other preform configurations may be used depending upon the desired configuration, characteristics and use of the final article. The preform 160 may be made by injection molding methods, without limitation.

The preform 160 includes a finish portion 164 and a body portion 168, formed monolithically (i.e., as a single, or unitary, structure). Advantageously, the monolithic arrangement of the preform 160, when blow-molded into a bottle, provides greater dimensional stability and improved physical properties in comparison to a preform constructed of separate neck and body portions that are bonded together.

The finish portion 164 begins at an opening 172 to an interior of the preform 160 and extends to and includes a tamper evidence ledge 176. The finish portion 164 is further characterized by the presence of one or more threads 180 configured to provide a means to fasten a closure, such as a cap, to the bottle produced from the preform 160. As such, the threads 180 are configured to rotatably engage with similar threads disposed within the cap to provide a way to seal contents within the bottle. In the embodiment illustrated in FIG. 2, each of the threads 180 generally extends along a section of the circumference of the finish portion 164 and approaches the tamper evidence ledge 176. Thus, when the threads of a cap are engaged with the threads 180, and the cap is rotated in a clockwise direction, the cap advances toward the tamper evidence ledge 176.

With continuing reference to FIG. 2, each of the one or more threads 180 begins at a thread start 184 and extends along an angular section of the finish portion 164. The thread start 184 is configured to guide the thread 180 into a space, or valley, between adjacent threads of the cap so as to threadably engage the cap with the finish portion 164. Further, the threads 180 generally are disposed adjacently to one another, separated by a valley 188, and are spaced uniformly around the circumference of the finish portion 164. In some embodiments, wherein three threads 180 are disposed around the finish portion 164, the thread starts 184 of adjacent threads 180 are spaced at substantially 120-degree intervals around the perimeter of the finish portion 164. As will be appreciated, however, more or less than three threads 180 may be incorporated into the finish portion 164 without deviating beyond the scope of the present disclosure.

In some embodiments, a plurality of gaps may be disposed in the threads 180 and positioned uniformly around the perimeter of the finish portion 164. Preferably, the gaps of adjacent threads 180 are vertically aligned so as to form channels extending longitudinally along the finish portion 164. The channels advantageously operate to relieve pressure within the container 100 when the container 144 is loosened. As will be appreciated, the channels may provide a direct route for gases escaping the interior of the container 100, rather than the gases being forced to travel around the finish portion 164 between adjacent threads 180.

The body portion 168 includes a neck portion 192 that extends to a tapered portion 196 of the body portion 168. The tapered portion 196 comprises a smooth transition from a diameter of the neck portion 192 to a relatively smaller diameter of a cylindrical portion 200 of the preform 160. The cylindrical portion 200 is a generally elongate member that culminates in an end cap 204. In some embodiments the body portion 168 may be generally cylindrical, and the end cap 204 may be conical or frustoconical and may also be hemispherical, and the very terminus of the end cap 204 may be flattened or rounded.

In some embodiments, a wall thickness of the cylindrical portion 200 may be substantially uniform throughout the cylindrical portion 200 and the end cap 204. A wall thickness of the tapered portion 196, however, generally decreases from the wall thickness of the cylindrical portion 200 to a relatively thinner wall thickness of the neck portion 192. As will be appreciated, the wall thickness of the cylindrical portion 200 is relatively greater than the wall thickness of the neck portion 192 so as to provide a wall thickness at the desired dimensions of a finished product after the preform 160 is blow-molded into the shape and size of a bottle. As such, the wall thickness throughout most of the body portion 168 will depend upon the overall size of the preform 160 and the wall thickness and overall size of the resulting container.

FIG. 3 illustrates a close-up cross-sectional view of a sidewall of the finish portion 164 illustrated in FIG. 2. As will be appreciated, the finish 164 comprises a cylindrical body that begins at the opening 172 to the interior of the container 100 and extends to and includes the tamper evidence ledge 176. The finish portion 164 includes a bevel 208 disposed at the beginning of the opening 172. The bevel 208 is configured to enter into sliding contact with a plug seal of the closure 144 so as to prevent contents from leaking out of the container 100 formed from the preform 160. In some embodiments, the bevel 208 operates to guide the plug seal onto a sealing surface 212 disposed on an interior of the finish portion 164. In general, the bevel 208 and the sealing surface 212 comprise portions of the interior of the finish portion 164 that extend circumferentially around the opening 172.

As will be appreciated, the sealing surface 212 must comprise a sufficiently smooth surface capable of cooperating with the plug seal to retain contents under pressure, such as carbonated contents, within the container 100. To this end, it is contemplated that the sealing surface 212 may be highly polished so as to be substantially free of surface defects and thus conditioned to form a tight seal with the plug seal of the closure 144. Preferably, the sealing surface 212 is to be polished to a degree of smoothness that is commonly associated with a mirror finish. As such, it is contemplated that the sealing surface 212 comprises a mirror polished region along the interior of the finish portion 164. Further, in some embodiments, the bevel 208 may also be conditioned to comprise a mirror polished region at the beginning of the opening 172. Any of various techniques may be used to mirror polish either or both of the sealing surface 212 and the bevel 208, without limitation.

As shown in FIG. 3, the sealing surface 212 extends away from the bevel 208, deeper into the opening 172 to a transition surface 216. The transition surface 216 comprises a region within the interior of the finish portion 164 wherein the interior diameter of the opening 172 generally narrows from the diameter of the sealing surface 212 to a smaller diameter of a handing surface 220. In the embodiment illustrated in FIG. 3, the transition surface 216 comprises a reverse curve surface that includes a concave portion 224 that extends from the sealing surface 212 and joins with a convex portion 228 that extends to the handing surface 220. As will be recognized, the handling surface 220 includes a diameter of the opening 172 that is configured to receive various forms of equipment used to configure the preform 160 into the container 100.

It is contemplated that the transition surface 216 is to be capable of cooperating with the plug seal of the closure 144 to form a tight seal between the closure 144 and the container 100. In some embodiments, the concave portion 224 may be configured to forcibly receive an end of the plug seal so as to form a tight seal therebetween. Further, in some embodiments, the convex portion 228 may be configured to forcibly receive the end of the plug seal. As such, the transition surface 216 may include a smooth surface that is polished similarly to the sealing surface 212. It is envisioned that the transition surface 216 may be mirror polished, as described hereinabove with respect to the sealing surface 212.

Moreover, in some embodiments, the plug seal of the closure 144 may be configured to extend into the opening such that the plug seal cooperates with the handling surface 220 to seal the container 100. In such embodiments, the plug seal may include a sidewall shape that mates with the concave and convex portions 224, 228. As will be appreciated, therefore, the handling surface 220 may be mirror polished similarly to the sealing surface 212 and the transition surface 216. It is contemplated that mirror polished surface may be achieved by way of any of various suitable polishing techniques, such as mechanical machining and buffing, chemical treatments, plasma treatments, and the like, without limitation.

In some embodiments, such as the illustrated embodiment of FIG. 3, a secondary transition surface 244 may be disposed between the handling surface 220 and an interior surface 248 of the body portion 168. In general, the secondary transition surface 244 comprises a region within the interior of the finish portion 164 wherein the interior diameter of the opening 172 narrows from the diameter of the handling surface 220 to a smaller diameter of the interior surface 248. In the embodiment illustrated in FIG. 3, the secondary transition surface 244 comprises a reverse curve surface that includes a concave portion 252 that extends from the handling surface 220 to a convex portion 256 that extends to the interior surface 248.

In some embodiments, the secondary transition surface 244 may be configured to cooperate with the plug seal of the closure 144 to form a tight seal between the closure 144 and the container 100 suitable for storing pressurized contents, such as carbonated beverages, within the container 100. As such, the concave portion 252 may be configured to tightly receive an end of the plug seal to form a tight seal therebetween. In some embodiments, the convex portion 256 may be configured to forcibly receive and compress the end of the plug seal. To this end, the secondary transition surface 244 preferably includes a smooth surface that is polished similarly to the sealing surface 212. It is envisioned that the secondary transition surface 244 may be mirror polished, as described hereinabove with respect to the sealing surface 212.

In some embodiments, the plug seal of the closure 144 may be configured to extend into the opening 172 such that the plug seal extends beyond the secondary transition surface 244 and thus cooperates with the portion of the interior surface 248 near the convex portion 256. In some embodiments, the interior surface 248 may have a diameter that tightly compresses the end of the plug seal to seal the pressurized contents within the container 100. It is contemplated that, in some embodiments, the plug seal may include a sidewall profile that mates with the concave and convex portions 252, 256. As such, the interior surface 248 preferably is mirror polished similarly to the mirror polish of the sealing surface 212. As disclosed hereinabove, the mirror polished surface may be achieved by way of any of various suitable polishing techniques, such as mechanical machining and buffing, chemical treatments, plasma treatments, and the like, without limitation.

In the embodiment illustrated in FIG. 3, the surfaces 212, 220, 248 generally comprise a stepped interior of the finish portion 164. As such, the stepped interior comprises a graduated narrowing of the opening 172 that extends from the bevel 208, through the finish portion 164, to the tamper evidence ledge 176. It is contemplated that the stepped interior comprises multiple sidewall portions of the finish 164 that may be configured to advantageously minimize the quantity of resin comprising the finish portion 164, as compared to finish portions comprising a substantially uniform diameter.

In some embodiments, the stepped interior may be configured to compressibly receive a plug seal of the closure 144 that comprises graduated seals configured to tightly engage with the graduated narrowing of the opening 172. For example, the stepped interior can include one or more sealing surfaces that are each configured to tightly engage with one of the graduated seals of the plug seal to contribute to forming a tight seal between the closure 144 and the container 100. As will be appreciated, therefore, the graduated seals of the plug seal generally include diameters that are suitable for engaging with the graduated narrowing of the opening 172 so as to seal pressurized contents, such as carbonated beverages, within the container 100. It is contemplated that the one or more sealing surfaces comprise mirror-polished surfaces that are joined together by transition surfaces. Further, the transition surfaces are contemplated to comprise mirror-polished surfaces that cooperate with the one or more seals of the plug seal so as to contribute to forming the tight seal between the closure 144 and the container 100.

In the exemplary embodiment shown in FIG. 3, the sealing surface 212 is configured to compressibly receive a first seal comprising the plug seal, and the handing surface 220 is configured to compressibly receive a second seal of the plug seal. Further, the interior surface 248 may be configured to compressibly receive a third seal comprising the plug seal. According, the sealing surface 212 includes a first diameter configured to tightly compress the first seal of the plug seal, and the handling surface 220 includes a second diameter configured to tightly compress the second seal. The interior surface 248 includes a third diameter configured to tightly compress the third seal of the plug seal. As will be appreciated, the third diameter is equal to or less than the second diameter, and the second diameter is equal to or less than the first diameter. Further, the transition surface 216 comprises a change in diameter of the opening 172 that transitions from the first diameter of the sealing surface 212 to the second diameter of the handling surface 220. The secondary transition surface 244 comprises a change in diameter of the opening 172 that transitions from second diameter of the handling surface 220 to the third diameter of the interior surface 248. As disclosed hereinabove, the transition surfaces 216, 244 comprise mirror-polished surfaces that may be formed by way of any of various suitable polishing techniques.

Figure 4:
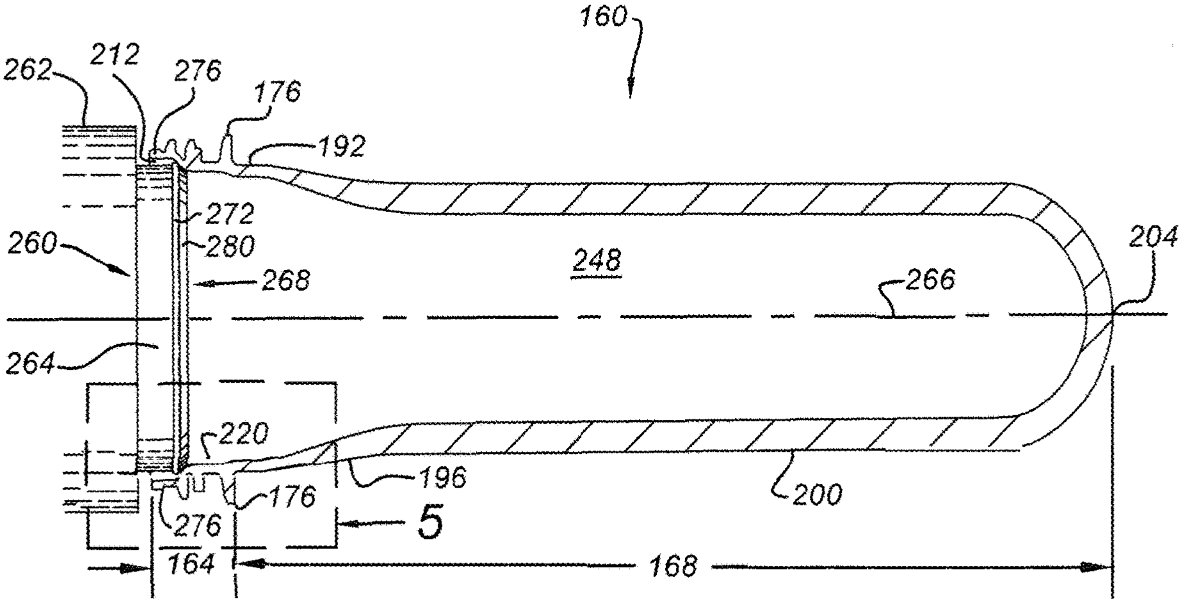
FIG. 4 illustrates a cross-sectional view of a container preform including a stepped interior surface that is engaged with an exemplary embodiment of a nozzle for forming lightweight containers according to the present disclosure.

Turning now to FIG. 4, a nozzle 260 for blow-molding the preform 160 into a container, such as the container 100, is shown inserted into the finish portion 164 and engaged with the stepped interior. The nozzle 260 generally comprises a cylindrical portion 264 that may be coupled with other blow-molding equipment 262 and is configured to be advanced along a longitudinal axis 266 of the preform 160 so as to tightly engage with the graduated narrowing within the finish portion 164. The nozzle 260 includes an opening 268 whereby instruments may be inserted into the preform 160 for stretching and/or blow-molding the preform 160 into the container 100. A seal 272 is disposed around the circumference of the cylindrical portion 264 and configured to tightly engage with the smooth surface inside the finish portion 164. In some embodiments, the seal 272 comprises an O-ring that is configured to tightly press against the mirror-polished surface of the finish portion 164 without damaging the surface or the sidewall of the finish portion 164. As such, it is contemplated that the preform 160 may be pressed onto the nozzle 260 during stretching and/or blow-molding the preform 160 to form the container 100.

Figure 5:
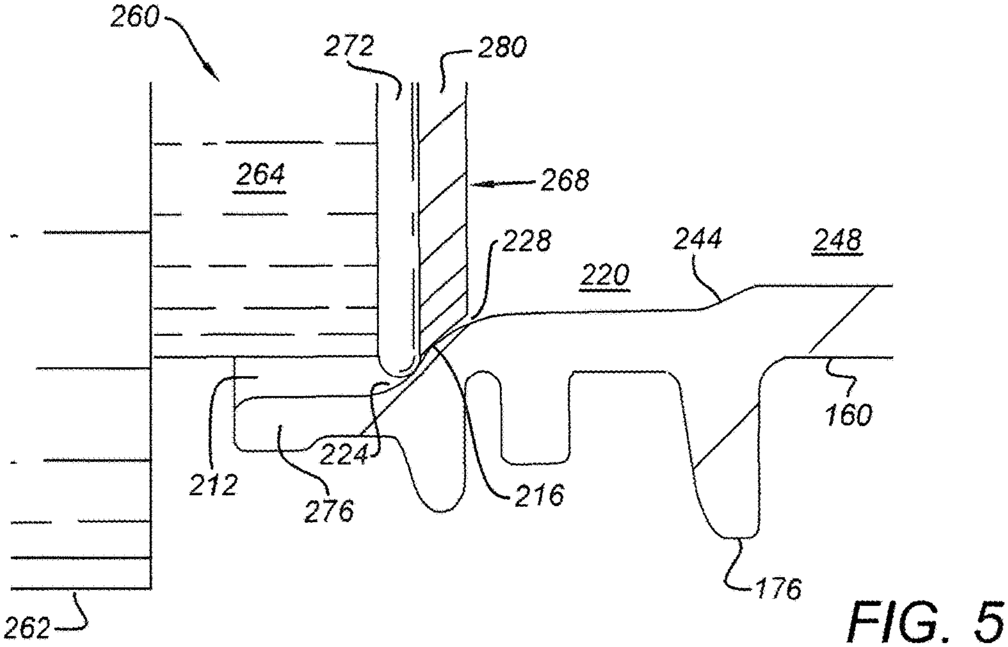
FIG. 5 illustrates a close-up cross-sectional view of a sidewall portion of the preform of FIG. 4 that is engaged with an exemplary embodiment of a nozzle for forming lightweight containers, in accordance with the present disclosure.

In the illustrated embodiment of FIGS. 4-5, the cylindrical portion 264 comprises a diameter suitable for pressing the seal 272 against the transition surface 216 of the preform 160 while maintaining an advantageous degree of clearance between the sealing surface 212 and the cylindrical portion 264. It should be understood, however, that the nozzle 260 is not limited to engaging the transition surface 216. For example, in some embodiments, the cylindrical portion 264 may be configured to have a diameter suitable for pressing the seal 272 against the secondary transition surface 244 while avoiding contact with both the sealing and handling surfaces 212, 220. As will be appreciated, preventing contact between the cylindrical portion 264 of the nozzle 260 and the surfaces 212, 220 substantially eliminates potential damage occurring to the mirror-polished surfaces within the finish portion 164.

As best shown in FIG. 5, the sealing surface 212 of the finish portion 164 is surrounded by a thin-walled region 276. In the case of light weight preforms, such as the preform 160, the thin-walled region 276 is susceptible to being damaged by contact with conventional blow-molding nozzles. Moreover, outwardly-directed forces on the thin-walled region 276, such as due to forcible contact between the surface 212 and a conventional nozzle or internal pressure during blow-molding the preform 160, tends to damage the sealing surface 212 and/or crack the thin-walled region 276. Such outwardly directed forces may be minimized, however, by engaging the seal 272 with the concave portion 224 of the transition surface 216. In particular, pressing the seal 272 against the concave portion 224 orients a relatively large component of the contact force in the direction of the longitudinal axis 266 in parallel with the sidewall of the finish portion 164 while minimizing a perpendicular component of the force acting outwardly on the thin-walled region 276 of the finish portion 164. Experimental observation has demonstrated that engaging the seal 272 with the concave portion 224 allows for tighter sealing between the nozzle 260 and the preform 160 as well as allowing for a relatively greater internal pressure within the preform 160 without cracking the thin-walled region 276 of the finish portion 164.

In some embodiments, the seal 272 may be pressed against either the convex portion 228 of the transition surface 216 or the midpoint of the transition surface 216 between the concave and convex portions 224, 228. Similar to the concave portion 224, the convex portion 228 directs a relatively large component of the force, due to the seal 272, in the direction of the longitudinal axis 266, parallel with the sidewall of the finish portion 164. Further, the perpendicular component of the contact force is better withstood by the finish portion 164 due to a relatively thicker sidewall of the finish portion 164 in the vicinity of the convex portion 228, as well as the separation distance between the convex portion 228 and the thin-walled region 276. As such, similar to engaging the concave portion 224, engaging the seal 272 with the convex portion 228 allows for tighter sealing between the preform 160 and the nozzle 260 as well as facilitating greater internal pressure within the preform 160 without cracking the thin-walled region 276 of the finish portion 164.

In the embodiment of the nozzle 260 illustrated in FIGS. 4-5, a tapered tip 280 is disposed forward of the seal 272. The tapered tip 280 comprises a decrease in the diameter of the nozzle 260 that is configured to accommodate the stepped interior of the preform 160. As shown in FIG. 5, the tapered tip 280 generally provides clearance between the nozzle 260 and the narrowing interior diameter of the transition surface 216 and the handing surface 220 of the preform 160. The tapered tip 292 is not limited to comprising a linearly tapering diameter of the nozzle 260, as shown in FIG. 5, but rather other shapes are contemplated. For example, in one embodiment, the tapered tip 292 comprises an inwardly rounded portion of the cylindrical portion 264 that is configured to prevent damage to the mirror-polished surfaces inside the finish portion 164 during insertion of the nozzle 260 into the preform 160. In some embodiments, however, the tapered tip 280 may be omitted from the nozzle 260, without limitation, thereby positioning the seal 272 at the tip of the nozzle 260.

It is contemplated that the seal 272 is not to be limited to O-rings, but rather the seal 272 may comprise any device capable of sealing the nozzle 260 to the preform 160 for the purpose of stretching and/or blow-molding the preform 160 into the container 100. In some embodiments, for example, the seal 272 may include a washer, a band, or an edge portion of the cylindrical portion 264 comprised of a material suitable for tightly sealing with the preform 160 without damaging the mirror-polished surfaces inside the finish portion 164. The material comprising the seal 272 may be any material that is generally suitable for sealing with the PET comprising the preform 160, such as, by way of non-limiting example, rubber, silicone, relatively softer PET that the PET comprising the preform 160, any combination thereof, and the like.

Figure 6:
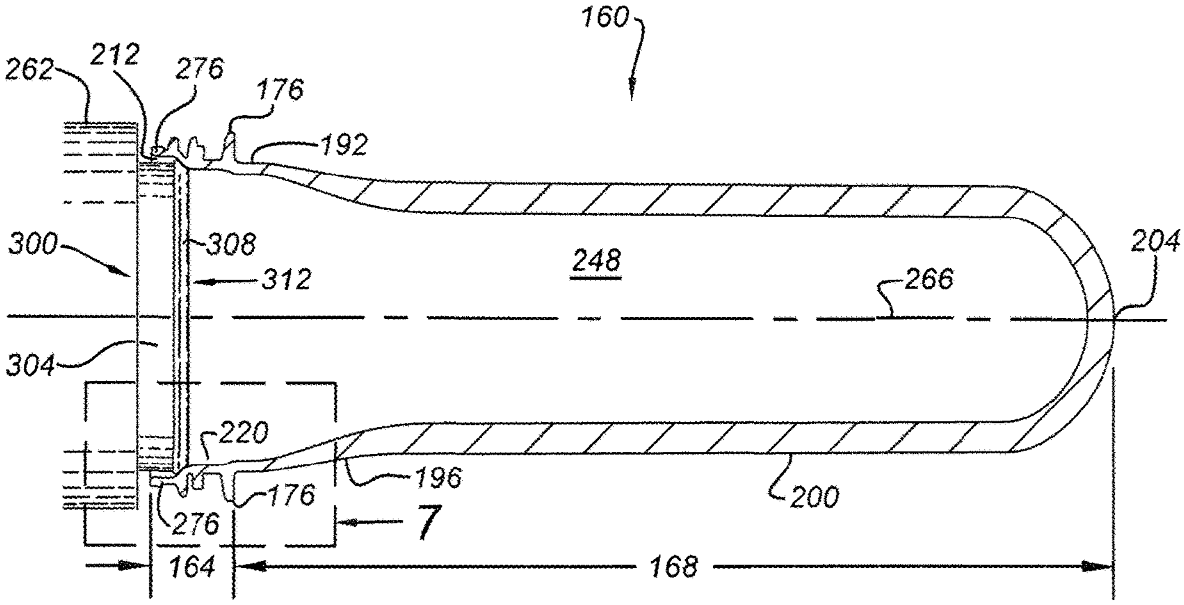
FIG. 6 illustrates a cross-sectional view of a container preform including a stepped interior surface that is engaged with an exemplary embodiment of a nozzle for forming lightweight containers according to the present disclosure.
Figure 7:
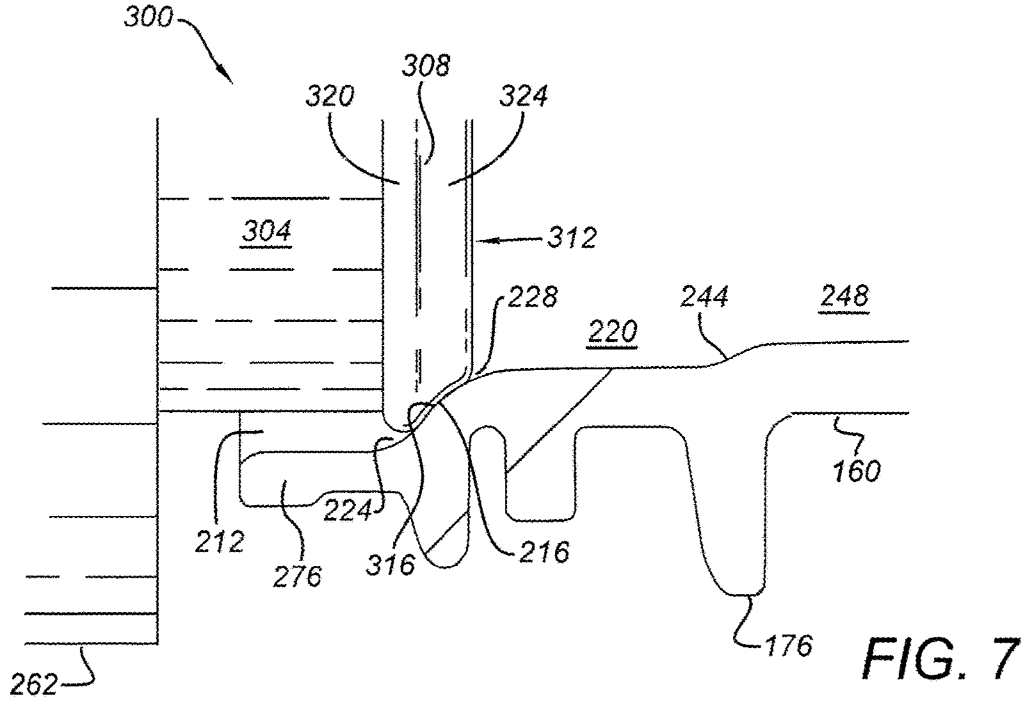
FIG. 7 illustrates a close-up cross-sectional view of a sidewall portion of the preform of FIG. 6 that is engaged with an exemplary embodiment of a nozzle for forming lightweight containers, in accordance with the present disclosure.

FIGS. 6-7 illustrate an exemplary embodiment of a nozzle 300 for blow-molding the preform 160 into a container, such as the abovementioned container 100. The nozzle 300 is shown inserted into the finish portion 164, parallel to the longitudinal axis 266, and engaged with the stepped interior of the preform 160. The nozzle 300 comprises a cylindrical portion 304 that may be coupled with other blow-molding equipment 262. The cylindrical portion 304 includes a seal 308 that is configured to tightly engage with the graduated narrowing of the interior surface within the finish portion 164 of the preform 160. The nozzle 300 includes an opening 312 whereby instruments may be inserted into the preform 160 for stretching and/or blow-molding the preform 160 into the container 100. The seal 308 is disposed around the circumference of the cylindrical portion 304 and configured to tightly engage with the smooth surface inside the finish portion 164. As will be appreciated, the seal 308 generally is configured to tightly press against the mirror-polished surface of the finish portion 164 without damaging the surface or the sidewall of the finish portion 164. As such, it is contemplated that the preform 160 may be pressed onto the nozzle 300 during stretching and/or blow-molding the preform 160 to form the container 100.

As described hereinabove, engaging the preform 160 at the transition surface 216 advantageously directs a component of the contact force along the sidewall of the preform 160, parallel to the longitudinal axis 266, thereby reducing the outward force exerted on the thin-walled region 276 of the finish portion 164. As best shown in FIG. 7, the seal 308 includes a profile shape 316 configured to mate with the transitional surface 216. In particular, the profile shape includes an outwardly rounded portion 320 to engage with the concave portion 224 and an inwardly-rounded portion 324 to engage with the convex portion 228. As will be appreciated, the profile shape 316 is disposed circumferentially around the seal 308, such that the seal 308 may be tightly engaged with the transition surface 216 during stretching and/or blow-molding the preform 160 to form the container 100.

With continuing reference to FIG. 7, the seal 308 is configured to be pressed against the transition surface 216 such that a component of the contact force is directed parallel to the longitudinal axis 266 and along the sidewall of the finish portion 164. As discussed hereinabove, orienting a portion of the contact force along the sidewall of the finish portion 164 serves to facilitate achieving greater internal pressure within the preform 160 without cracking the thin-walled region 276 of the finish portion 164. Further, the perpendicular component of the contact force is better withstood by the finish portion 164 due to the relatively thicker sidewall of the finish portion 164 in the vicinity of the transition surface 216.

Moreover, it should be recognized that the seal 308 is configured to contact a greater portion of the transition surface 216 the seal 272. As such, the contact force between the nozzle 300 and the preform 160 is distributed over a relatively greater area of the transition surface 216. Thus, the total pressure exerted on the finish portion 164 by the nozzle 300 is lower than the total pressure exerted by the nozzle 260. Those skilled in the art will appreciate that reducing the total pressure exerted on the finish portion 164 by the nozzle 260 facilitates utilizing greater internal pressures within the preform 160 without cracking the thin-walled region 276 of the finish portion 164 during stretching and/or blow-molding the preform 160 to form the container 100.

Figure 8:
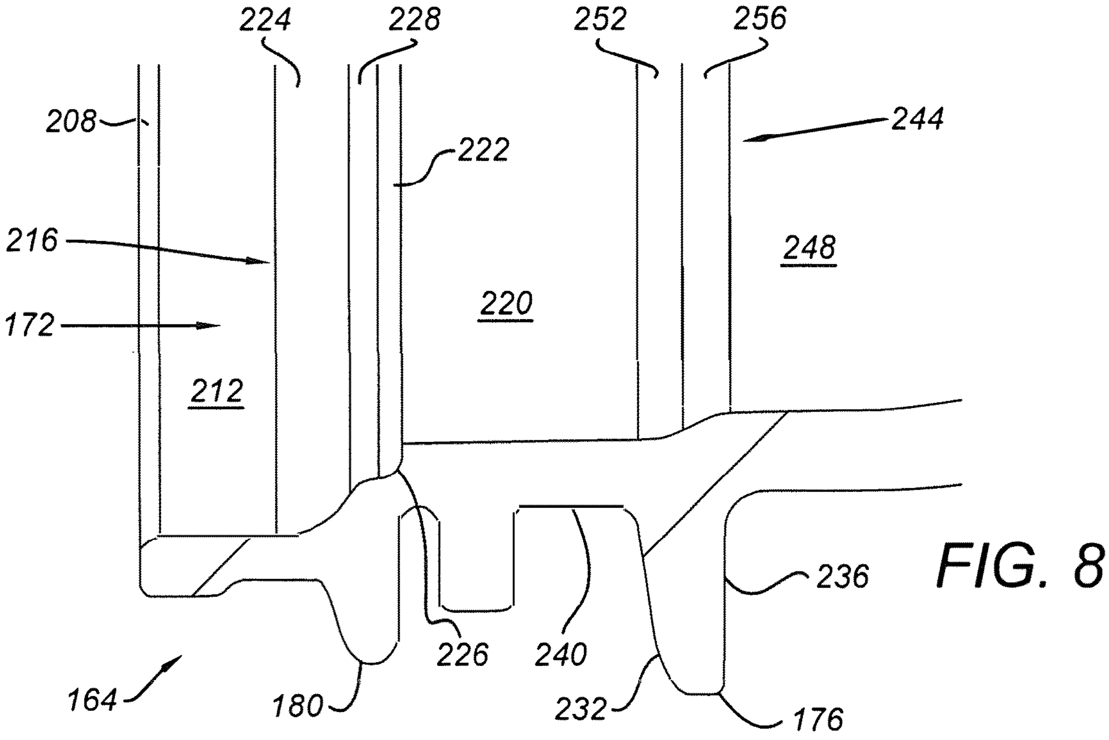
FIG. 8 illustrates a close-up cross-sectional view of an exemplary embodiment of a sidewall portion of a finish that may comprise the preform illustrated in FIG. 2, according to the present disclosure.

FIG. 8 illustrates a close-up cross-sectional view of an exemplary embodiment of a sidewall of the finish portion 164 illustrated in FIG. 2. The finish portion 164 shown in FIG. 8 is substantially similar to the finish portion shown in FIG. 3, with the exception that the finish portion 164 of FIG. 8 includes a shelf 222. The shelf 222 generally comprises an abrupt change in diameter of the opening 172 and extends from the convex portion 228 to the handing surface 220. Nearest the handing surface 220, the shelf 222 comprises a surface that is substantially perpendicular to the handing surface 220. In the embodiment of FIG. 8, the shelf 222 includes a concave profile shape 226, but in some embodiments, the profile shape 226 may comprise a chamfer or a bevel, without limitation. The handling surface 220 generally includes a diameter of the opening 172 that is configured to receive various forms of equipment used to configure the preform 160 into the container 100.

Figure 9:
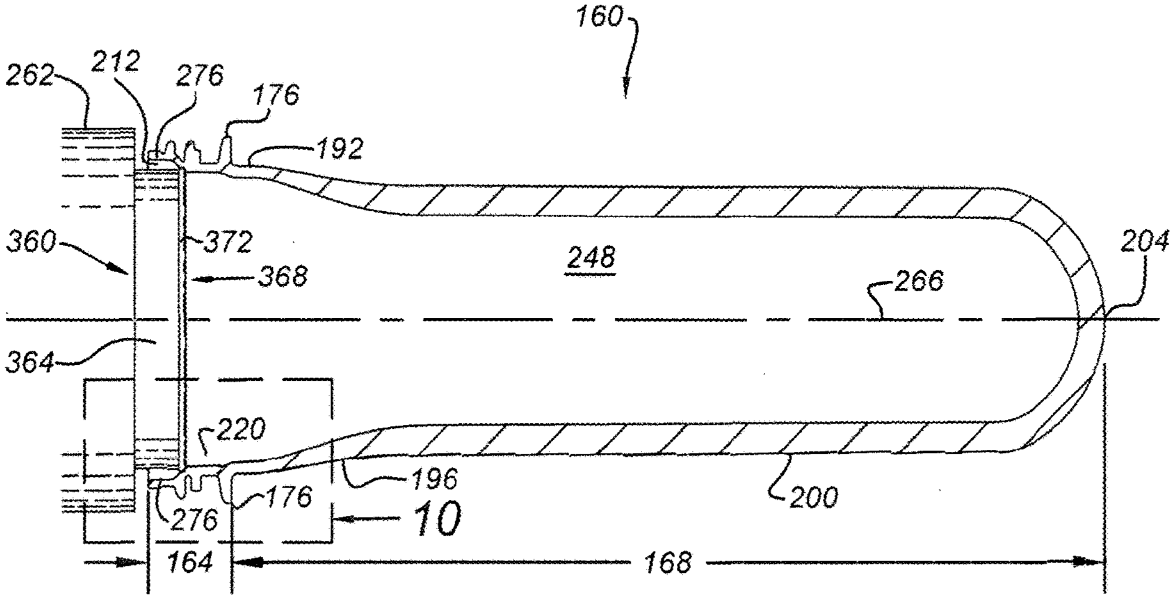
FIG. 9 illustrates a cross-sectional view of a container preform including a stepped interior surface that is engaged with an exemplary embodiment of a nozzle for forming lightweight containers according to the present disclosure.

FIG. 9 illustrates an exemplary embodiment of a nozzle 360 for engaging with the finish portion 164 of FIG. 8 during blow-molding the preform 160 into a container, such as the container 100. The nozzle 360 generally comprises a cylindrical portion 364 that may be coupled with other blow-molding equipment 262 and is configured to be advanced along a longitudinal axis 266 of the preform 160 so as to tightly engage with the graduated narrowing within the finish portion 164. The nozzle 360 includes an opening 368 whereby instruments may be inserted into the preform 160 for stretching and/or blow-molding the preform 160 into the container 100.

Figure 10:
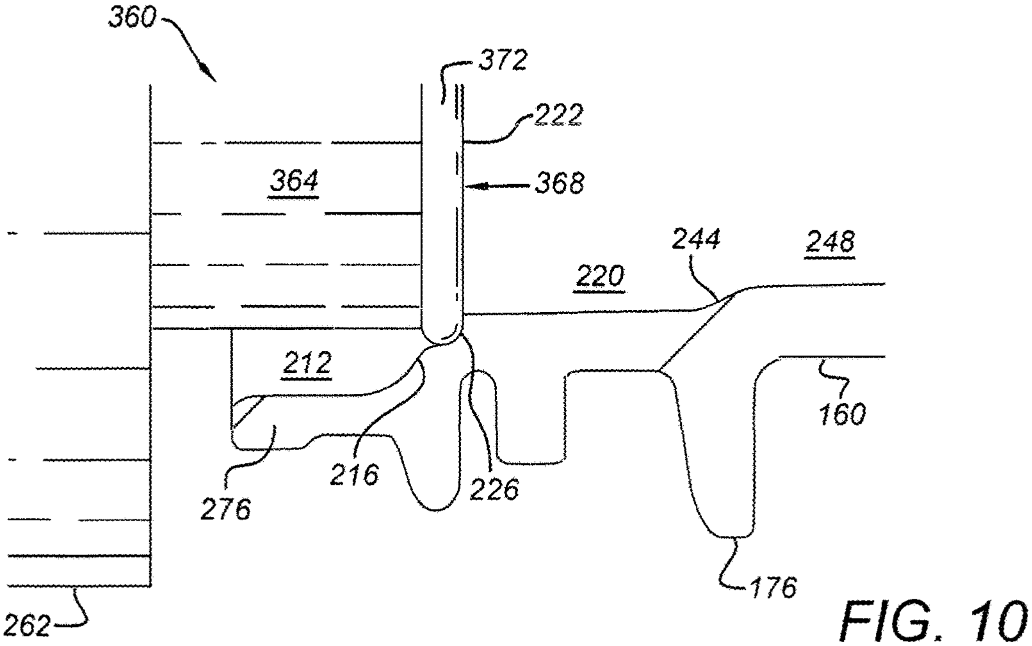
FIG. 10 illustrates a close-up cross-sectional view of a sidewall portion of the preform of FIG. 9 that is engaged with an exemplary embodiment of a nozzle for forming lightweight containers, in accordance with the present disclosure.

As best shown in FIG. 10, a seal 372 is disposed at a forward-most location of the cylindrical portion 364 and configured to tightly engage with the shelf 222 inside the finish portion 164. It is contemplated that the shelf 222 comprises a mirror-polished surface capable of receiving the seal 372. In some embodiments, such as the embodiment of FIGS. 9-10, the seal 372 comprises an O-ring disposed around a circumference of the cylindrical portion 364 and is configured to tightly press against the concave profile shape 226 of the shelf 222 without damaging the surface or the sidewall of the finish portion 164. As such, the cylindrical portion 364 comprises a diameter suitable for pressing the seal 372 against the shelf 222 of the preform 160 while maintaining an advantageous degree of clearance between the sealing surface 212 and the cylindrical portion 364.

As best shown in FIG. 10, the sealing surface 212 of the finish portion 164 is surrounded by a thin-walled region 276. In the case of lightweight preforms, such as the preform 160, the thin-walled region 276 is susceptible to being damaged by contact with conventional blow-molding nozzles. Moreover, outwardly-directed forces on the thin-walled region 276, such as due to forcible contact between the surface 212 and a conventional nozzle or internal pressure during blow-molding the preform 160, tends to damage the sealing surface 212 and/or crack the thin-walled region 276. Such outwardly directed forces may be substantially eliminated, however, by engaging the seal 372 with the shelf 222. In particular, pressing the seal 372 against the shelf 222 orients substantially an entirety of the contact force in the direction of the longitudinal axis 266 in parallel with the sidewall of the finish portion 164 while substantially eliminating outward stress on the thin-walled region 276 of the finish portion 164. It is contemplated, therefore, that engaging the seal 372 with the shelf 222 allows for tighter sealing between the nozzle 360 and the preform 160 as well as allowing for a relatively greater internal pressure to be applied to the preform 160 without cracking the thin-walled region 276 of the finish portion 164.

As will be appreciated, the forward-most position of the seal 372 with respect to the cylindrical portion 364 serves to prevent potential damage to the surfaces 212, 220 during insertion of the cylindrical portion 364 into the finish portion 164. It should be understood, however, that the seal 372 is not to be limited to O-rings, but rather the seal 372 may comprise any device capable of sealing the nozzle 360 to the shelf 222 of the preform 160 for the purpose of stretching and/or blow-molding the preform 160 into the container 100. In some embodiments, for example, the seal 372 may include a washer, a band, or an edge portion of the cylindrical portion 364 comprised of a material suitable for tightly sealing with the shelf 222 without damaging the mirror-polished surfaces 212, 220 inside the finish portion 164. The material comprising the seal 372 may be any material that is generally suitable for sealing with the PET comprising the preform 160, such as, by way of non-limiting example, rubber, silicone, relatively softer PET that the PET comprising the preform 160, any combination thereof, and the like.

In some embodiments, a circular edge may be coupled with the cylindrical portions 364 either in addition to the seal or in lieu of the seal 372. The circular edge may be permanently disposed at a distal end of the cylindrical portion 364 or may be extendible from the cylindrical portion 364 and retractable into the cylindrical portion 364 through a suitable mechanical means. The circular edge may be configured to forcibly contact the transition surface 216 or the shelf 222 of the finish portion 164. Preferably, the circular edge 360 has a diameter suitable to contact the transition surface 216 or the shelf 222 while providing clearance between the first cylindrical portion 364 and the sealing surface 212. It is contemplated that upon the nozzle 360 being inserted into the finish portion 164, the circular edge digs into the material comprising the transition surface 216 or the shelf 222, thereby establishing a tight seal between the nozzle 360 and the interior of the preform 160. As such, it is further contemplated that the circular edge may be sharpened or remain blunt, as desired, and generally comprises any rigid material suitable for digging into the material comprising the transition surface 216 or the shelf 222.

In general, the circular edge may be configured press against the transition surface 216 or the shelf 222 such that the force of contact is directed parallel to the longitudinal axis 266, along the sidewall of the finish portion 164. As such, directing the contact force parallel to the sidewall of the finish portion 164 allows for tighter sealing between the nozzle 360 and the preform 160; thereby facilitating greater internal pressures within the preform 160 without cracking the thin-walled region 276 of the finish portion 164 during stretching and/or blow-molding the preform 160 to form the container 100.

Figure 11:
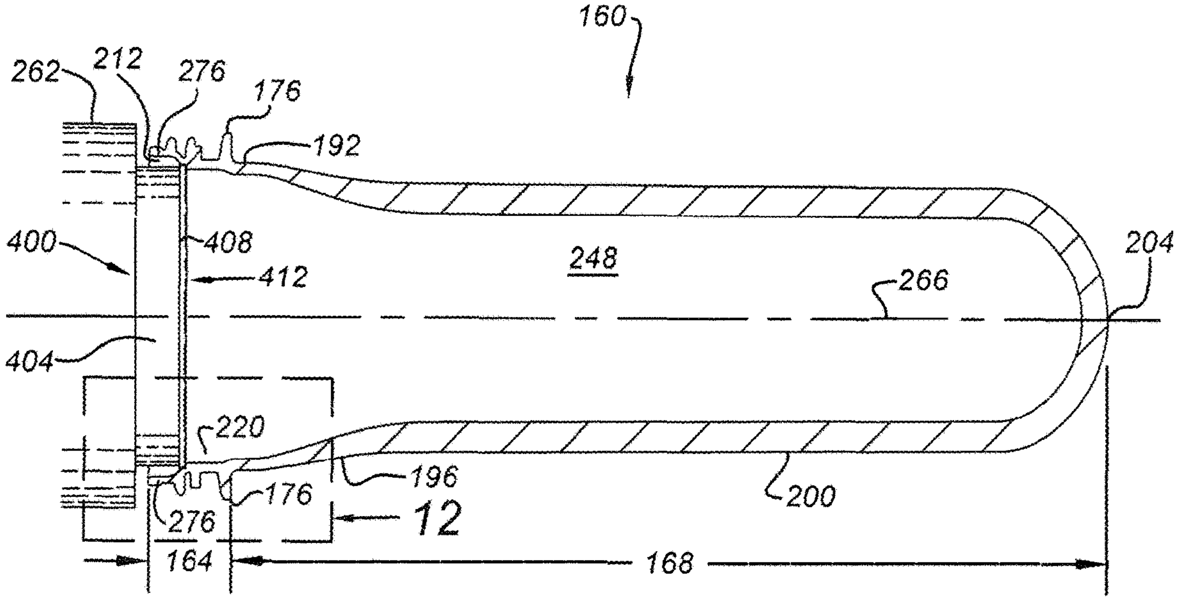
FIG. 11 illustrates a cross-sectional view of a container preform including a stepped interior surface that is engaged with an exemplary embodiment of a nozzle for forming lightweight containers according to the present disclosure.
Figure 12:
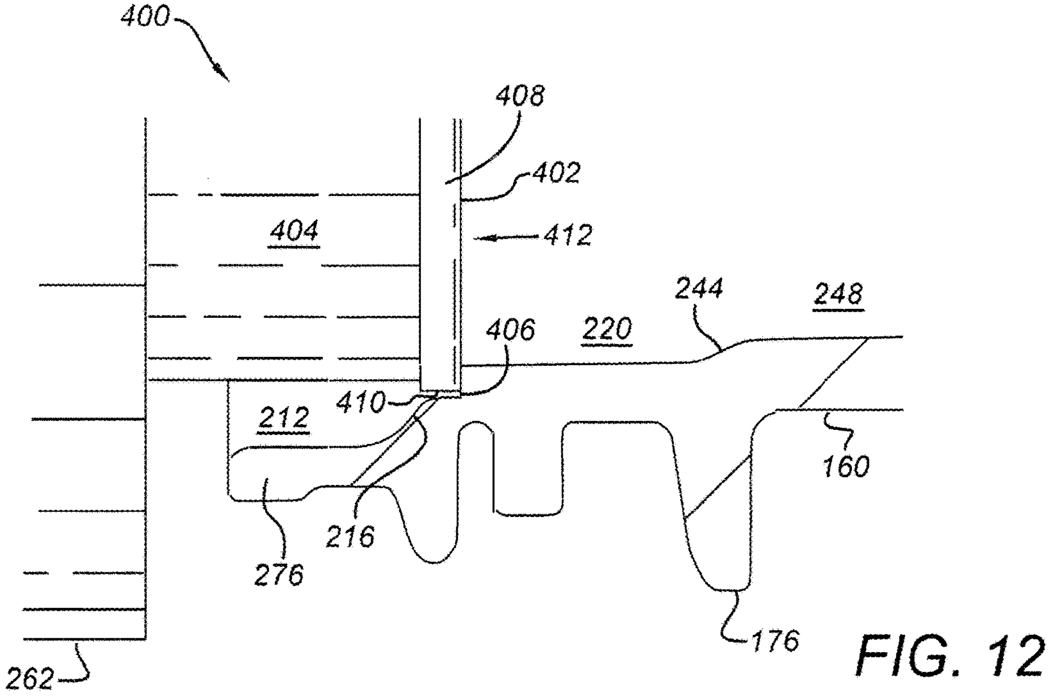
FIG. 12 illustrates a close-up cross-sectional view of a sidewall portion of the preform of FIG. 11 that is engaged with an exemplary embodiment of a nozzle for forming lightweight containers, in accordance with the present disclosure.

FIGS. 11-12 illustrate an exemplary embodiment of a nozzle 400 for blow-molding the preform 160 into a container, such as the abovementioned container 100. The nozzle 400 is shown inserted into the finish portion 164, parallel to the longitudinal axis 266, and engaged with the stepped interior of the preform 160. The nozzle 400 comprises a cylindrical portion 404 that may be coupled with other blow-molding equipment 262, The cylindrical portion 404 includes a seal 408 that is configured to tightly engage with a shelf 402 disposed in the interior surface of the finish portion 164 of the preform 160. The nozzle 400 includes an opening 412 whereby instruments may be inserted into the preform 160 for stretching and/or blow-molding the preform 160 into the container 100. The seal 408 is disposed around the circumference of the cylindrical portion 404 and configured to tightly press against the shelf 402 without damaging the surfaces 212, 220 or the sidewall of the finish portion 164. As such, it is contemplated that the preform 160 may be pressed onto the nozzle 400 during stretching and/or blow-molding the preform 160 to form the container 100.

Upon comparing the embodiment of the preform 160 illustrated in FIG. 12 with the embodiment illustrated in FIG. 10, it is straightforward to see that the shelf 402 of FIG. 12 includes a profile shape 406 that differs from the profile shape 226 of FIG. 10. In particular, whereas the profile shape 226 is concave so as to receive the O-ring comprising the seal 372, the profile shape 406 generally is squared, or right-angled, to receive the seal 408. In one embodiment, the seal 408 comprises a washer, in lieu of an O-ring. Accordingly, the seal 408 generally includes a squared periphery 410, unlike the seal 372. As will be appreciated, the squared periphery 410 is disposed circumferentially around the seal 408, such that the seal 408 may be tightly engaged with the profile shape 406 of the shelf 402 during stretching and/or blow-molding the preform 160 to form the container 100.

With continuing reference to FIG. 12, the seal 408 is configured to be pressed against the shelf 402 such that the force of contact is directed parallel to the longitudinal axis 266 and along the sidewall of the finish portion 164. As discussed hereinabove, orienting the contact force along the sidewall of the finish portion 164 allows for tighter sealing between the nozzle 400 and the preform 160. Further, the force is distributed throughout an area of contact between the seal 408 and the shelf 402. As such, the total pressure exerted on the finish portion 164 by the nozzle 400 is lower than the total pressure exerted by conventional nozzles that include O-rings. Those skilled in the art will appreciate that reducing the total pressure exerted on the finish portion 164 facilitates utilizing greater internal pressures within the preform 160 without cracking the thin-walled region 276 of the finish portion 164 during stretching and/or blow-molding the preform 160 to form the container 100.

In some embodiments, the nozzle 400 may be configured to include a cylindrical portion 404 that terminates at a circular edge configured to forcibly contact the transition surface 216 or the shelf 222 of the finish portion 164. As such, upon the nozzle 400 being inserted into the finish portion 164, the circular edge digs into the material comprising the transition surface 216 or the shelf 222, thereby establishing a tight seal between the nozzle 400 and the interior of the preform 160. The circular edge of the cylindrical portion 404 may be configured to be pressed against the transition surface 216 or the shelf 222 such that the force of contact is directed parallel to the longitudinal axis 266, along the sidewall of the finish portion 164, As will be appreciated, directing the contact force parallel to the sidewall of the finish portion 164 allows for tighter sealing between the nozzle 400 and the preform 160, thereby facilitating greater internal pressures within the preform 160 without cracking the thin-walled region 276 of the finish portion 164 during stretching and/or blow-molding the preform 160 to form the container 100. It is contemplated that the circular edge may be sharpened or remain blunt, as desired. Further, the cylindrical portion 404 generally, and the circular edge in particular, may comprise any rigid material suitable for digging into the material comprising the preform 160.

With reference, again, to FIG. 3, the tamper evidence ledge 176 comprises a rounded upper portion 232 and a substantially flat lower portion 236. As will be appreciated, the rounded upper portion 232 facilitates passing the tamper evidence band 148 of the closure 144 over the tamper evidence ledge 176 during assembly of the closure 144 onto the container 100. The flat lower portion 236 is configured to retain the tamper evidence band 148 positioned below the tamper evidence ledge 176 during loosening of the closure 144. For example, when the closure 144 is initially installed onto the container 100 by a manufacturer, the tamper evidence band 148 easily passes over the tamper evidence ledge 176 due to the rounded upper portion 232. When an end-user later loosens the closure 144, the flat lower portion 236 retains the tamper evidence band 148 below the tamper evidence ledge 176, causing the tamper evidence band 148 to break loose from the closure 144. Thus, the flat lower portion 236 of the tamper evidence ledge 176 and the tamper evidence band 148 of the closure 144 cooperate to indicate to the end-user that the closure 144 has not been previously loosened after being installed by the manufacturer. It should be understood, however, that the tamper evidence ledge 176 is not limited to being coupled with tamper evidence bands, as described above, but rather the tamper evidence ledge 176 may be configured to operate with any of various devices for indicating whether or not the container has been previously opened.

Disposed between the tamper evidence ledge 176 and the threads 180 is a handling valley 240 that extends circumferentially around the finish portion 164. The handling valley 240 comprises a portion of the finish portion 164 that has a wall thickness and a diameter that are substantially similar to the wall thickness and diameter of the neck portion 192, below the tamper evidence ledge 176. As such, the handling valley 240 and the neck portion 192 advantageously enable gripping fingers to engage with and support the container 100 during air-conveying the container 100 along a manufacturing assembly. For example, a first pair of gripping fingers can extend into the handling valley 240 to support the container 100 at a first station of a manufacturing line. Then, upon being conveyed to a second station, a second pair of gripping fingers can extend around the neck portion 192, below the tamper evidence ledge 176, while the first pair of gripping fingers are removed from the handling valley 240. Similarly, upon arriving at a third station, a third pair of gripping fingers can engage with the handling valley 240 while the second pair of gripping fingers are removed from the neck portion 192. Thus, the container 100 can be transported along the manufacturing line by alternatingly engaging gripping fingers with the handling valley 240 and the neck portion 192.

As will be appreciated, the handling valley 240 provides a separation between the tamper evidence ledge 176 and the threads 180 suitable for receiving the pair of gripping fingers, as described above. In general, the separation must be large enough to allow the gripping fingers to easily pass between the tamper evidence ledge 176 and the threads 180. As such, any of various separations, greater than the width of the gripping fingers, may be disposed between the tamper evidence ledge 176 and the threads 180, without limitation and without deviating beyond the scope of the present disclosure.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention, Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

The invention claimed is:

1. A nozzle for forming a container preform into a plastic container, the nozzle comprising:
- a nozzle body; and
- a sealing portion proximate an end of the nozzle body and configured to engage a transition surface of a stepped interior of a finish portion of a preform having a longitudinal axis to preclude any portion of the nozzle body from contacting an interior surface of the preform.

2. The nozzle of claim 1, wherein the nozzle body further includes a tip comprising a narrowing portion of the nozzle body forward of the sealing portion.

3. The nozzle of claim 2, wherein the narrowing portion of the nozzle body is a linearly narrowing portion.

4. The nozzle of claim 2, wherein the narrowing portion of the nozzle body includes a rounding of the tip.

5. The nozzle of claim 1, wherein the sealing portion is configured to engage the transition surface without the use of an O-ring.

6. The nozzle of claim 1, wherein the nozzle body is configured to engage the transition surface such that a majority component of a contact force is directed parallel with the longitudinal axis.

7. A nozzle for forming a container preform into a plastic container, the nozzle comprising:
- a nozzle body; and
- a sealing portion proximate an end of the nozzle body and configured to engage one of 1) a concave surface or 2) a convex surface of a stepped interior of a finish portion of a preform having a longitudinal axis to preclude any portion of the nozzle body from contacting an interior surface of the preform.

8. The nozzle of claim 7, wherein the nozzle body further includes a tip comprising a narrowing portion of the nozzle body forward of the sealing portion.

9. The nozzle of claim 8, wherein the narrowing portion of the nozzle body is a linearly narrowing portion.

10. The nozzle of claim 8, wherein the narrowing portion of the nozzle body includes a rounding of the tip.

11. The nozzle of claim 7, wherein the sealing portion is configured to engage the concave surface without the use of an O-ring.

12. The nozzle of claim 7, wherein the sealing portion is configured to engage the concave surface.

13. The nozzle of claim 7, wherein the sealing portion is configured to engage the convex surface without the use of an O-ring.

14. The nozzle of claim 7, wherein the sealing portion is configured to engage the convex surface.

15. A nozzle for forming a container preform into a plastic container, the nozzle comprising:

a nozzle body; and a sealing portion proximate an end of the nozzle body and configured to engage with a stepped interior of a finish portion of a preform having a longitudinal axis to seal without the use of an O-ring and to preclude any portion of the nozzle body from contacting the stepped interior.

16. The nozzle of claim 15, wherein the nozzle body further includes a tip comprising a narrowing portion of the nozzle body forward of the sealing portion.

17. The nozzle of claim 16, wherein the narrowing portion of the nozzle body is a linearly narrowing portion.

18. The nozzle of claim 16, wherein the narrowing portion of the nozzle body includes a rounding of the tip.

19. The nozzle of claim 15, wherein the nozzle body is configured to engage the stepped interior such that a majority component of a contact force is directed parallel with the longitudinal axis.

* * * * *